3,563,996
PIPERIDINE DERIVATIVES

Andrea Pedrazzoli and Gianmario Cipelletti, Milan, Italy, assignors to Societe d'Etudes de Recherches et d'Applications Scientifiques et Medicales E.R.A.S.M.E., Paris, France, a French society
No Drawing. Filed Aug. 21, 1967, Ser. No. 661,811
Claims priority, application Great Britain, Aug. 23, 1966, 37,826/66
Int. Cl. C07d 29/28
U.S. Cl. 260—294.3    6 Claims

ABSTRACT OF THE DISCLOSURE

The disclosure is of heterocyclic compounds derived from arylamino-propane-2-ol and a method of preparing them, the compounds having the general formula:

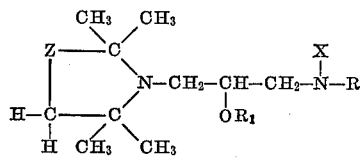

wherein:

Z is the group —$CH_2$—$CH_2$— or the group —CH=CH—
R is a substituted or unsubstituted phenyl, benzyl or phenylethyl radical,
$R_1$ is either a hydrogen atom, in which case X is a hydrogen atom or a $CH_3$ radical, or
$R_1$ is a $COR_2$ group, $COR_2$ being a substituted or unsubstituted phenoxyacetic or aromatic acid residue or a phenylthioacetic acid residue which may or may not be substituted in the ring, in which case X is a $CH_3$ radical, The method comprises reacting a compound of the formula:

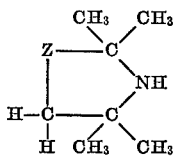

with epichlorhydrin, reacting the product obtained with an amine of the formula:

X and R being the substituents defined above, and then reacting the product obtained with an acid chloride of the formula:

$$R_2COCl$$

The products of the invention are stable to light and to heat, they have a low toxicity and a remarkable pharmacological activity, being antihistaminic, myolitic, anolgesic, anti-inflammatory, antipyretic, and psychotropically tranquilising and, particularly, local anesthetic.

---

The present invention relates to new heterocyclic compounds derived from arylamino-propane-2-ol.
The compounds of the invention have the following general formula:

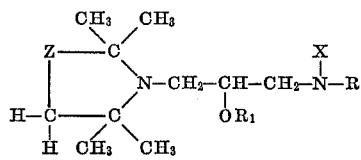

where:

Z is the group —$CH_2$—$CH_2$— or the group —CH=CH—
R is a substituted or unsubstituted phenyl, benzyl or phenylethyl radical,
$R_1$ is either a hydrogen atom, in which case X is a hydrogen atom or a $CH_3$ radical, or
$R_1$ is a $COR_2$ group, $COR_2$ being a substituted or unsubstituted phenoxyacetic or aromatic acid residue or a phenylthioacetic acid residue which may or may not be substituted in the ring, in which case X is a $CH_3$ radical.

The invention also concerns pharmaceutically useful salts of these products with organic and inorganic acids.
The process of preparation of the products of the invention, where $R_1$=H, can be represented by the following reaction scheme:

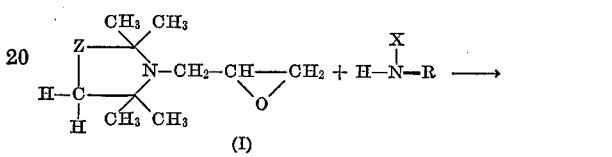

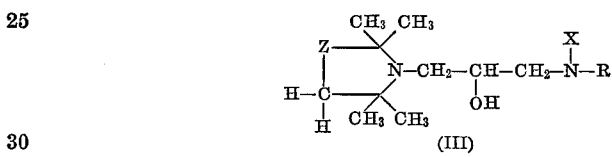

X being a hydrogen atom or methyl radical. Thus a heterocyclic derivative of 2,3-epoxypropane is reacted with an amine RNHX in the presence or absence of polar or nonpolar solvents, by boiling for periods ranging from 5 to 72 hours. The starting material (I), which has not been described in the literature, can be obtained by reacting:

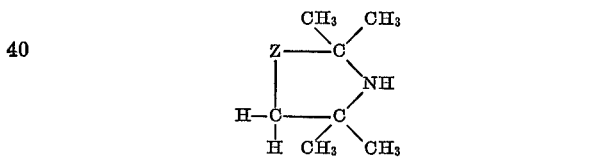

viz. 2,2,6,6-tetramethyl-piperidine or 1,2,3,6 - tetrahydro-2,2,6,6-tetramethylpyridine, with epichlorohydrin at the boiling point in an inert solvent, such as toluene or xylene, for a period ranging from 12 to 72 hours and then treating the cooled mass with powdered anhydrous alkali metal hydroxides and distilling off the product obtained.

When in the compound III X is a methyl radical, this compound can be treated with an acid chloride to give the corresponding esters according to the following scheme:

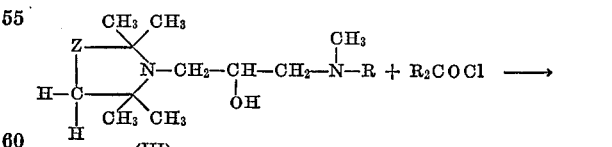

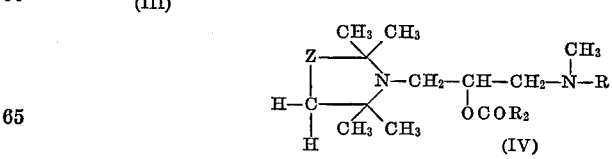

The product III dissolved in an inert organic solvent such as benzene, toluene, xylene, tetrahydrofuran or dimethylformamide, can be esterified by reaction with an acid halide (preferably an acid chloride $R_2COCl$), in the presence or absence of a basic hydrogen acceptor, such as tertiary amines (triethylamine, pyridine or dimethylaniline) to give the corresponding esters (IV). The reaction takes place at room temperature, but it is preferable to complete it by heating under reflux for some hours. At the end of the esterification reaction, the products can be separated from the reaction mass in the form of the bases or as salts of pharmaceutically useful inorganic or organic acids, such as hydrochlorides, sulphates, phosphates or citrates.

The products of the invention are stable to light and to heat, they have a low toxicity and a remarkable pharmacological activity, being antihistaminic, myolitic, analgesic, anti-inflammatory, antipyretic and psychotropically tranquilising and, particularly, local anaesthetic.

In general, the compounds of the invention have an excellent local anaethetic action in conduction, surface and infiltration.

This action has been evaluated by the following tests:

(a) conduction anaesthesia in rats (Setnikar, I., Arzneimittel-Forschung, 16, 1025, 1966)
(b) conduction anaesthesia in mice (Bianchi, C., Br. J. Pharmacol. 11, 104, 1956)
(c) surface anaesthesia in rabbit eyes (Regnier, T., Bull. Sci. Pharmacol., 30, 580 and 646, 1923)
(d) infiltration anaesthesia in guineapigs (Bulbring, E., Wajde, I., J. Pharmacol., 85, 78, 1945).

Some compounds of the invention also have a general anaesthetic, myolitic and anti-convulsant activity.

The compounds of the invention generally have an acute toxicity lower than or analogous to that of local anaesthetics usually used (lidocaine, novocain).

Even the effects on pressure and on respiration in cats anaesthetised with Nembutal are not different from those caused by the same doses of lidocaine.

The compounds of the invention which are the most active and best tolerated can be used as local anaesthetics in operations in general surgery, gynaecology, otorinolaryngoloy, odonto-stomatology, dermatology and so on.

By way of example, the anaesthetic actions obtained with compounds A and B are given below, of the fomulae:

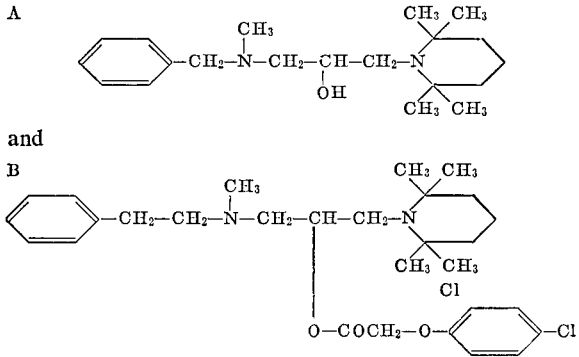

| Compound | DL50 in mice per os, mg./kg. | Conc. used, percent | Local anaesthetic action in the guinea pig [1] | | | | | | |
|---|---|---|---|---|---|---|---|---|---|
| | | | 5' | 10' | 15' | 20' | 30' | 45' | 60' |
| A | 600 | 0.60 | 100 | 100 | 100 | 80 | 60 | 60 | 80 |
| B | 1,000 | 0.75 | 100 | 100 | 100 | 100 | 80 | 60 | 60 |

[1] Percent of animals anaesthetised locally following s.c. administration of the medicament.

The following examples illustrate the invention without limiting it.

EXAMPLE 1

1-(2',2',6',6'-tetramethyl-piperid-1'-yl)-3-(N-methyl-N-benzylamino)-propane-2-ol-dihydrochloride 1-(2',2',6',6'-tetramethyl-piperid-1'-yl)-2,3 - epoxypropane was prepared by reacting, at the boiling point for 48 hours, a mixture of 141 g. of 2,2,6,6-tetramethylpiperidine, 94 g. of epichlorohydrin and 200 ml. of anhydrous toluene. 80 g. of pulverised molten anhydrous potassium hydroxide was added in small amounts with agitation to the solution cooled to 10° C. The mixture was left under agitation for 24 hours, then washed with water, dried, concentrated and distilled under vacuum. 108 g. of 1-(2',2',6',6'-tetramethyl-piperid-1'-yl)-2,3 - epoxypropane was obtained, boiling at 91°–93° C. at 1.5 mm. Hg.

A mixture of 39.4 g. of 1-(2',2',6',6'-tetramethyl-piperid-1'-yl)-2,3-epoxypropane and 26.62 g. of N-methyl-N-benzylamine was heated under reflux for 20 hours. By distillation 51 g. of a base boiling at 173°–177° C. at 0.4 mm. Hg was obtained. When treated with isopropanol and gaseous HCl with the addition of isopropyl ether, the base gave 49 g. of crude product.

After crystallisation from isopropanol, 45 g. of pure product was obtained; M.P. 228°–230° C.

EXAMPLE 2

1-(2',2',6',6'-tetramethyl-piperid-1'-yl)-3-(2'',3''-dimethyl-aniline)-propane-2-ol-dihydrochloride A solution of 39.4 g. of 1-(2',2',6',6' - tetramethyl-piperid-1'-yl)-2,3-epoxypropane, 24.62 g. of 2,3-dimethyl-aniline and 100 ml. of n-butanol was heated under reflux for 72 hours. By concentration and distillation, 31 g. of 1 - (2',2',6',6'-tetramethyl-piperid-1'-yl) - 3 - (2'',3''-dimethyl-aniline)-propane-2-ol boiling at 210°–213° C. at 0.4 mm. Hg were obtained. On crystallisation from isopropanol, the base had an M.P. of 85°–86.5° C.

On treatment with hydrochloric acid in isopropanol, the dihydrochloride was obtained; M.P. 228°–230° C.

EXAMPLE 3

1-(2',2',6',6' - tetramethyl-piperid-1'-yl)-3-(N-methyl-m-chloroaniline)-2-(m-chloro-benzoyloxy) propane hydrochloride A solution of 17.1 g. of m-chlorobenzoyl chloride in 150 ml. of anhydrous benzene and, somewhat later, a solution of 11.1 g. of triethylamine in 50 ml. of anhydrous benzene were slowly added at room temperature to a solution of 32.3 g. of 1-(2',2',6',6'-tetramethyl-piperid-1'-yl) - 3 - (N-methyl-m-chloroaniline)-propane-2-ol in 150 ml. of anhydrous benzene. At the end of the addition, the mixture was heated for 2 hours at 100° C. It was then cooled and filtered and the filtrate was washed with water, with dilute sodium bicarbonate solution and again with water. After drying, the residual oil was concentrated and treated with gaseous hydrogen chloride dissolved in isopropyl ether. The solid obtained was crystallised from isopropanol to give 36 g. of 1-(2',2',6',6'-tetramethyl-piperid-1'-yl) - 3 - (N-methyl-m-chloroaniline)-2-(m-chloro-benzoyloxy) - propane hydrochloride; M.P.=205°–206° C.

EXAMPLE 4

1 - (1',2',3',6' - tetrahydro-2',2',6',6'-tetramethyl-pyridyl-1')-3-[N-(α-phenethyl)-amino]propane-2-ol 1-(1',2',3',6'-tetrahydro - 2',2',6',6' - tetramethyl-pyridyl-1')-2,3-epoxy-propane was prepared by reacting, at the boiling point for 48 hours, a mixture of 139 g. of 1,2,3,6-tetrahydro-2,2,6,6-tetramethyl-pyridine, 94 g. of epichlorhydrin and 200 ml. of anhydrous xylene; 80 g. of pulverised anhydrous potassium hydroxide was added in portions to the solution cooled to 10° C. and stirred. It was stirred for 24 hours at room temperature and was then filtered, concentrated and distilled under vacuum; 118 g. of 1-(1',2',3',6'-tetrahydro-2',2',6',6'-tetramethyl-pyridyl-1')-2,3-epoxy-propane boiling at 125° C. under 18 mm. Hg was obtained.

A mixture of 39 g. of 1-(1,2,3,6-tetrahydro-2,2,6,6-tetramethyl-pyridyl-1')-2,3-epoxy-propane, 26.6 g. of α-phenethyl-amine and 50 ml. of n-amyl alcohol was heated under reflux for 48 hours; by distillation 48 g. of a base boiling at 191°–193° C. under 0.6 mm. Hg was obtained.

EXAMPLE 5

1 - (1',2',3',6' - tetrahydro-2',2',6',6'-tetramethyl-pyridyl-1') - 3 - (2",6"-N-trimethyl-aniline)-propane-2-ol dihydrochloride A mixture of 39 g. of 1-(1',2',3',6'-tetrahydro-2',2',6',6'-tetramethyl-pyridyl-1')-2,3-epoxy-propane, 25 g. of 2,6-N-trimethylaniline and 40 ml. of n-amyl alcohol was heated under reflux for 72 hours; by distillation 51 g. of a base boiling at 163°–168° C. under 0.3 mm. Hg was obtained; when cold the base was treated with isopropanol and gaseous HCl and gave the crude hydrochloride; after crystallisation from ethanol, the pure product was obtained, having an M.P.=220°–222° C. (with decomposition).

EXAMPLE 6

1 - (1',2',3',6' - tetrahydro-2',2',6',6'-tetramethyl-pyridyl-1') - 2 - (2",4"-dichlorophenoxy-acetoxy)-3-(N-methyl-benzylamine) propane dihydrochloride To a solution of 31.6 g. of 1-(1',2',3',6'-tetrahydro-2',2',6',6' - tetramethyl)-3-(N-methyl-benzylamine)-propane-2-ol in 100 ml. of anhydrous benzene was slowly added at room temperature, a solution of 24 g. of 2,4-dichlorophenoxy-acetyl-chloride in 200 ml. of anhydrous benzene and, a short time later, a solution of 11.1 g. of triethylamine in 50 ml. of anhydrous benzene; when the addition was completed, the solution was heated for 2 hours at the boiling point, was cooled, filtered and the filtrate was washed with water, then with a solution of sodium bicarbonate and then with water again; after drying, the oil obtained, dissolved in isopropyl ether, was concentrated and treated with gaseous HCl; the solid obtained melted at 210°–212° C. After crystallisation from anhydrous ethanol, 27 g. of hydrochloride with an M.P.=212°–214° C. was obtained.

The main compounds prepared according to the invention are given in Table I below.

GENERAL FORMULA

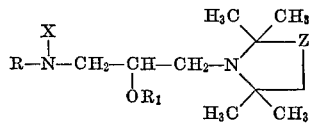

TABLE I

| Compound No. | R | $R_1$ | X | Z | Formula of product obtained | Melting point or boiling point (mm. Hg) |
|---|---|---|---|---|---|---|
| 1 | ⟨phenyl⟩—CH$_2$— | H | CH$_3$ | CH$_2$—CH$_2$ | $C_{20}H_{34}NO \cdot 2HCl$ | 228–230 |
| 2 | Same as above | H | CH$_3$ | CH=CH | $C_{20}H_{32}NO \cdot 2HCl$ | 235–237 |
| 3 | ⟨phenyl⟩—CH$_2$—CH$_2$— | H | CH$_3$ | CH$_2$—CH$_2$ | $C_{21}H_{36}N_2O \cdot 2HCl$ | 224–226 |
| 4 | Same as above | H | CH$_3$ | CH=CH | $C_{21}H_{34}NO \cdot 2HCl$ | 224–227 |
| 5 | ⟨phenyl⟩—CH(CH$_3$)— | H | H | CH=CH | $C_{20}H_{32}N_2O$ | 191–193 (0.6) |
| 6 | Same as above | H | CH$_3$ | CH=CH | $C_{21}H_{34}N_2O$ | 180–183 (0.3) |
| 7 | ⟨2-methylphenyl⟩— | H | H | CH$_2$—CH$_2$ | $C_{19}H_{32}NO \cdot 2HCl$ | 222–225 |
| 8 | Same as above | H | CH$_3$ | CH$_2$—CH$_2$ | $C_{20}H_{34}N_2O \cdot 2HCl$ | 213–219 |
| 9 | ⟨2,6-dimethylphenyl⟩— | H | H | CH$_2$—CH$_2$ | $C_{20}H_{34}N_2O \cdot 2HCl$ | 242–245 |
| 10 | Same as above | H | CH$_3$ | CH$_2$—CH$_2$ | $C_{21}H_{36}N_2O \cdot 2HCl$ | 209–211 |
| 11 | do | H | CH$_3$ | CH=CH | $C_{21}H_{34}N_2O \cdot 2HCl$ | 220–222 (d) |
| 12 | ⟨2,6-dimethylphenyl, H$_5$C/CH$_3$⟩— | H | H | CH$_2$—CH$_2$ | $C_{20}H_{34}N_2O \cdot 2HCl$ | 228–230 |
| 13 | Same as above | H | CH$_3$ | CH$_2$—CH$_2$ | $C_{21}H_{36}N_2O \cdot 2HCl$ | 203–205 |
| 14 | ⟨2-chlorophenyl⟩— | H | H | CH$_2$—CH$_2$ | $C_{18}H_{29}ClN_2O \cdot 2HCl$ | 210–211 |
| 15 | Same as above | H | CH$_3$ | CH$_2$—CH$_2$ | $C_{19}H_{31}ClN_2O \cdot 2HCl$ | 232–234 |
| 16 | Cl—⟨phenyl⟩ | H | H | CH$_2$—CH$_2$ | $C_{18}H_{29}ClN_2O \cdot 2HCl$ | 218–223 |

TABLE I.—Continued

| Compound No. | R | R₁ | X | Z | Formula of product obtained | Melting point or boiling point (mm. Hg) |
|---|---|---|---|---|---|---|
| 17 | 4-(F₃C)-C₆H₄- | H | H | CH₂—CH₂ | $C_{19}H_{29}F_3N_2O \cdot 2HCl$ | 197–200 |
| 18 | Same as above | H | CH₃ | CH₂—CH₂ | $C_{20}H_{31}F_3N_2O \cdot 2HCl$ | 245–247 |
| 19 | 2,4-(CH₃)₂-C₆H₃- | H | CH₃ | CH₂—CH₂ | $C_{20}H_{33}ClN_2O$ | 190–193 (0.3) |
| 20 | 2-Cl-4-CH₃-C₆H₃- | H | CH₃ | CH₂—CH₂ | $C_{20}H_{33}ClN_2O$ | 195–200 (0.3) |
| 21 | Same as above | H | CH₃ | CH=CH | $C_{20}H_{31}ClN_2O \cdot HCl$ | 206–208 |
| 22 | 4-Cl-2-CH₃-C₆H₃- | H | CH₃ | CH₂—CH₂ | $C_{20}H_{33}ClN_2O$ | 190–193 (0.3) |
| 23 | Same as above | H | CH₃ | CH₂—CH₂ | $C_{20}H_{33}ClN_2O$ | 198–200 (0.2) |
| 24 | C₆H₅-CH₂- | 2,6-Cl₂-4-(O-CH₂-CO)-C₆H₂- | CH₃ | CH=CH | $C_{28}H_{36}Cl_2N_2O_3 \cdot 2HCl$ | 212–214 |
| 25 | C₆H₅-CH₂-CH₂- | Same as above | CH₃ | CH₂—CH₂ | $C_{29}H_{40}Cl_2N_2O_3 \cdot 2HCl$ | 178–81 |
| 26 | Same as above | do | CH₃ | —CH=CH— | $C_{29}H_{38}Cl_2N_2O_3 \cdot 2HCl$ | 196–198 |
| 27 | C₆H₅-CH(CH₃)- | 2-Cl-C₆H₄-CO— | CH₃ | —CH=CH— | $C_{28}H_{37}ClN_2O_2 \cdot HCl$ | 211–213 |
| 28 | 2,3-(CH₃)₂-C₆H₃- | Same as above | CH₃ | —CH₂—CH₂— | $C_{28}H_{39}ClN_2O_2 \cdot 2HCl \cdot C_3H_8O$ ¹ | 149–152 |
| 29 | Same as above | 4-Cl-C₆H₄-O-CH₂-CO- | CH₃ | —CH₂—CH₂— | $C_{29}N_{41}ClN_2O_3 \cdot HCl$ | 204–206 |
| 30 | 4-Cl-C₆H₄- | 4-Cl-C₆H₄-CO- | CH₃ | —CH₂—CH₂— | $C_{26}H_{34}Cl_2N_2O_2 \cdot HCl$ | 205–206 |
| 31 | Same as above | 4-Cl-C₆H₄-O-CH₂-CO- | CH₃ | —CH₂—CH₂— | $C_{27}H_{36}Cl_2N_2O_3$ | 98–99.5 |

¹ Crystallisation with ½ molecule of isopropanol.
NOTE.—(d)=decomposition.

We claim:
1. A compound selected from the group consisting of:
(a) a compound of the general formula:

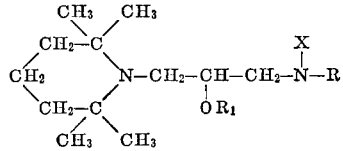

wherein:
R is benzyl, phenethyl, phenyl, or phenyl substituted by at least one of methyl, chloro, or trifluoromethyl;
X is a hydrogen atom or methyl; and
R₁ is a hydrogen atom or a group —COR₂ in which R₂ is phenyl, phenyl substituted by a chlorine atom, phenoxymethyl, or phenoxymethyl in which the phenyl radical is substituted by at least one chlorine atom, X being methyl when R₁ is —COR₂; and
(b) a pharmaceutically useful salt thereof with an acid.

2. A compound of claim 1 wherein
R is benzyl, X is methyl, and R₁ is a hydrogen atom.

3. The compound of claim 1 which is
1-(2′,2′,6′,6′-tetramethyl - piperid - 1′-yl)-3-(N-methyl-N-benzyl-amino)-propane-2-ol dihydrochloride.

4. The compound of claim 1 which is
1-(2′,2′,6′,6′-tetramethyl - piperid - 1′-yl)-3-(2″,3″-dimethyl-anilino)-propane-2-ol.

5. The compound of claim 1 which is
1-(2′,2′,6′,6′ - tetramethyl-piperid - 1′-yl)-3-(2″,3″-dimethyl-anilino)-propane-2-ol dihydrochloride.

6. The compound of claim 1 which is
1(2′,2′,6′,6′ - tetramethyl - piperid-1′-yl)-2-(2″,4″-dichloro phenoxy - acetoxy)-3 - [N-methyl-N(β-phenethyl)amino]-propane dihydrochloride.

References Cited

UNITED STATES PATENTS

| | | | |
|---|---|---|---|
| 1,915,334 | 6/1933 | Salzberg et al. | 260—243 |
| 2,075,359 | 3/1937 | Salzberg et al. | 167—22 |

OTHER REFERENCES

Chemical Abstracts, vol. 29, 2148⁸, 1935, Drozdov et al.

Fieser et al.: Organic Chemistry, 3rd ed., 1956, pages 181–82. JACS, vol. 80, pages 1257–59, 1958, Heywood et al.

HENRY R. JILES, Primary Examiner

S. D. WINTERS, Assistant Examiner

U.S. Cl. X.R.

260—293.4, 294.7, 294.8, 295, 296, 297; 424—267, 263